United States Patent Office 3,144,426
Patented Aug. 11, 1964

3,144,426
PROCESS FOR THE PREPARATION OF AQUEOUS DISPERSIONS OF GRAFT INTERPOLYMER MATERIAL
Oliver W. Burke, Jr., 1238 Berkshire Road, Grosse Pointe, Mich., Oscar M. Grace, Madison Heights, Mich., and Rene G. Jennen, deceased, late of Detroit, Mich., by Michael Berry, temporary public administrator, Dearborn, Mich.; said Grace and said Berry assignors to said Burke
No Drawing. Filed Mar. 4, 1960, Ser. No. 12,684
1 Claim. (Cl. 260—29.7)

This invention relates to the methods of preparing of aqueous dispersions of polymer modified partially halogenated isoolefin-multiolefin interpolymers and modifications thereof, and the products obtained therefrom and the aqueous dispersions thereof and certain uses thereof.

The present invention is more specifically concerned with processes for and the products from such processes including the polymerization of polymerizable monomers including conjugated and non-conjugated dienes dienes, vinyl, vinylidene, allyl and other monomers having a plurality of unsaturated carbon to carbon bonds including polar monomers e.g. halo-monomers in the presence of partially halogenated isoolefin-multiolefin interpolymers; the new polymer modified partially halogenated polymers per se; the combination of these interpolymers with halogenated unsaturated polymers with aminoplasts and phenoplasts including halogenated aminoplast or phenoplasts; the new aqueous dispersions of these interpolymers and their combinations and the vulcanizates thereof.

The halogenation of isoolefin-multiolefin interpolymers in a solvent is known to the patent art and set forth in U.S. Patents 2,631,984; 2,698,041; 2,720,479; 2,732,354; 2,804,448; 2,809,372; 2,816,098; 2,865,901; 2,857,357; and this invention teaches that monomer material may be polymerized in the presence of these partially halogenated interpolymers (prepared according to these cited patents) to produce new interpolymers which can be converted with the aid of a suitable emulsifier and water into aqueous dispersions heretofore unknown which are new and unique products with useful properties.

The isoolefin-multiolefin interpolymer which are partially halogenated and employed in the processes of this invention include those known as "butyl rubbers" which are vulcanizable elastic interpolymers of isobutylene and small amounts of a diolefin such as, for example, isoprene and butadiene-1,3 (for further information regarding butyl rubber and its manufacture see R. J. Adams and E. J. Buckler's article entitled "Evolution and Application of Butyl" in the Transactions of the Institute of Rubber Industry, vol. 29, No. 1, February 1953, pages 17–31) and such interpolymers have been described in U.S. Patents 2,322,073; 2,356,128; 2,356,129; 2,356,130; 2,373,706; 2,384,975; 2,418,913 and others. It is the principal object of the present invention to provide new polymer modified, partially halogenated isoolefin-multiolefin interpolymers; a further object is to provide new aqueous dispersions of these polymer modified partially halogenated isoolefin-multiolefin interpolymers; a further object is to provide aqueous dispersions of said interpolymers which are latex compounded including with resols as set forth hereinafter; a further object is to provide unique combinations of said interpolymers with other known plastomers and/or elastomers and/or phenoplasts and/or aminoplasts including with halogenated unsaturated polymers and halogenated aminoplasts and phenoplasts which can aid in the vulcanization thereof and a further object is to provide vulcanizates of these new interpolymers with or without other materials including halogenated unsaturated polymeric material present. Other objects of the invention will become apparent from the description of this invention and the examples thereof.

Thus isoolefin-multiolefin interpolymers are (1) halogenated with a halogenating agent capable of providing said interpolymer with fluoro-, chloro-, bromo- or iodogroups or combinations of any two or more of these halogen groups and such halogenation of said isoolefin-multiolefin interpolymer may be conducted with or without solvent and (2) polymer modification of said partially halogenated isoolefin-multiolefin interpolymer is accomplished by polymerizing monomer material including monomers containing at least one polymerizable carbon to carbon bond including polymerizable conjugated diene, non-conjugated diene, vinyl, vinylidene allyl groups or combinations of such groups, in the presence of said partially halogenated interpolymer with the aid of a free-radical generating polymerization catalyst with or without a solvent being present and (3) dispersing with the aid of an emulsifying agent and water, said polymer modified partially halogenated interpolymer to form an aqueous dispersion and such aqueous dispersion, step (3) is preferably carried out in the presence of a volatile solvent for said interpolymer, said solvent being in major proportion and water immiscible with or without minor of volatile or non-volatile water miscible solvent and upon forming the aqueous dispersion, removing at least the water immiscible solvent and (4) if the aqueous dispersion is of a vulcanizable interpolymer, that is, a polymer modified partially halogenated isoolefin interpolymer of which at least a part of the halogen groups of said interpolymer being chlorine and/or bromine, then aqueous compounding said with aqueous dispersed compounding ingredients including with halogenated unsaturated polymers, aminoplasts, phenoplasts, halogenated aminoplasts or phenoplasts capable of aiding in the vulcanization of said vulcanizable interpolymers, as for example, the resols set forth hereinafter and (5) concentrating said aqueous dispersions of interpolymer either before or after addition of the aqueous dispersed or dissolved compounding ingredient and said concentration being conducted with or without the aid of heat or vacuum and with or without the aid of a polymeric creaming agent as set forth hereinafter and (6) forming said aqueous dispersions into films, filaments or mass objects with or without foaming of the latter by letting the water evaporate, or coating materials with such aqueous dispersions including coating films, filaments, threads, fibers, woven materials or mass objects and allowing the water to evaporate, or employing such aqueous dispersions as latex paints or decorative coatings and if such aqueous dispersions are aqueous compounded then vulcanizing said latex or the new interpolymer products derived therefrom by removal of the water. The processes and products including application of products from steps (2) through (5) are new, unique and useful.

Thus these new aqueous dispersions produced according to this invention may be combined with elastomer latices including natural rubber and synthetic rubber latices and/or with plastomer latices such as vinyl latices and the like to produce new and useful latex compositions. These new latex combinations may be latex compounded including compounded with halogenated unsaturated polymers, with aminoplasts, with phenoplasts, with halogenated aminoplasts and/or phenoplasts.

DEFINITION OF TERMS

The invention is concerned with the processes of preparing new polymer modified partially halogenated interpolymers, the aqueous dispersions therefrom and in describing the process and products hereafter certain terms will be employed which will now be generally defined and hereafter set forth in more detail and also certain limits of the invention will be set out in defining these terms.

The term "partially halogenated isoolefin-multiolefin interpolymer" is set out in more detail hereinafter, however, this term is employed in a composite sense the individual terms thereof are defined hereafter and include the term "interpolymer," "isoolefin-multiolefin interpolymer" and "partially halogenated."

By the term "interpolymer" is meant the polymerization product produced when two or more monomers are polymerized together and includes when two or more different monomer molecules enter into the same polymer molecules, such interpolymers are also referred to as copolymers and further by the term "interpolymer" is meant the polymerization product produced when two or more different monomers are polymerized sequentially or one or more monomers are polymerized in the presence of a polymer; as for example when natural rubber is swollen with methyl methacrylate and the latter polymerized therewith, then the resulting product is an "interpolymer" according to this definition and when the components of an interpolymer are inseparable from one another because the component polymers are chemically bonded to one another then the newly created interpolymer polymer is also referred to as a graft polymer. Thus according to this definition the polymer modified partially halogenated isoolefin-multiolefin polymers are interpolymers and in some instances are graft interpolymers.

By the term "isoolefin-multiolefin interpolymer" is meant those polymer compositions set forth under this heading hereinafter comprising polymerized $C_4$ to $C_8$ isoolefins in major proportion by weight and polymerized $C_4$ to $C_{18}$ multiolefin in minor proportion by weight and the preferred interpolymer being 70 to 99.5 percent by weight and the most preferred being 90 to 99.5 percent by weight polymerized $C_4$ to $C_8$ isoolefins and the remainder being polymerized multiolefin with or without other monomers.

By the term "butyl rubber" is meant those interpolymers of 90 to 99.5 percent by weight polymerized isobutylene and the remainder polymerized hydrocarbon conjugated diene e.g. isoprene.

By the term "partially halogenated" is meant fluoro-, chloro-, bromo- and iodo-groups and combinations of these groups attached directly to the polymer or attached through the residue of the halogenating agent to the polymer and the amount of halogen present in the partially halogenated polymer depends on the residual unsaturation of the interpolymer being halogenated and may be as high as 30 percent by weight, the preferred amount is 10 percent by weight or less and the most preferred amount is 5 percent by weight or less based on the partially halogenated polymer product (excluding the emulsifying or dispersing agent).

By the term "halogenating agent" is meant those materials set forth under this heading hereafter. Such halogenating agents are most effective in solvents or in aqueous medium which such are soluble or at least partially soluble in, as will be appreciated by one skilled in the art.

ISOOLEFIN-MULTIOLEFIN INTERPOLYMERS

The isoolefin-multiolefin interpolymers employed in this invention include not only those solid, plastic, rubbery interpolymers set forth in the above-listed patents under butyl rubbers heretofore but particularly those set forth in U.S. Patent No. 2,720,479; examples being interpolymers of a major proportion, desirably from 70 to 99% by weight, of an isoolefin containing from 4 to 8 carbon atoms such as isobutylene, 3-methyl butene-1, 4-methyl pentene-1, 2-ethyl butene-1, 4-ethyl pentene-1 or the like, or a mixture of such isoolefins with a minor proportion, desirably from 1 to 30% by weight, of a multiolefin generally containing from 4 to 18 carbon atoms, or two, three or more such multiolefins including the following: (1) acyclic or open-chain conjugated diolefins such as butadiene-1,3, isoprene, 2,4-dimethyl butadiene-1,3, piperylene, 3 - methyl pentadiene - 1,3, hexadiene - 2,4, 2 - neopentyl butadiene-1,3, and the like; (2) the minor proportion of such interpolymer being a multiolefin containing from 4 to 18 carbon atoms with or without other monomers and including acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom; (3) alicyclic diolefins, both conjugated and non-conjugated, such as cyclo-pentadiene, cyclo-hexadiene, 1-vinyl cyclohexene-3, 1-vinyl cyclohexene-1, 1-vinyl cyclopentene-1, 1-vinyl cyclobutene-2, dicyclopentadiene and the like as well as monocyclic diolefinic terpenes such as dipentene, terpinenes, terpinolene, phellandrines, sylvestrene and the like; (4) acyclic triolefins such as 2,6-dimethyl-4-methylene-heptadiene-2,5,2-methyl hexadiene-1,3,5 and other conjugated triolefins, as well as myrcene, ocimene, alloocimene and the like; (5) alicyclic triolefins such as fulvene, 6,6-dimethyl fulvene, 6,6-methyl ethyl fulvene, 6-ethyl fulvene, 6,6-diphenyl fulvene, 6-phenyl fulvene and other fulvenes wherein the 6 carbon hydrogens are substituted by alkyl, cycloalkyl or aryl; as well as other alicyclic triolefins such as 1,3,3-trimethyl-6-vinyl-cyclohexadiene-2,4, cycloheptatriene, etc.; and (6) higher polyolefins such as 6,6-vinyl methyl fulvene (a tetraolefin) and 6,6-diisopropenyl fulvene (a penta olefin).

The preferred solid, plastic, rubbery interpolymers are generally prepared by low temperature (from 0° C. to —200° C.) interpolymerization using an appropriate catalyst such as an active metal halide or Friedel-Crafts type catalyst (aluminum chloride or boron trifluoride) dissolved in a low freezing solvent such as methyl or ethyl chloride. These interpolymers generally have an average molecular weight above 15,000, iodine numbers of preferably from 0.5 to 50, and they are reactive with sulfur to form elastic products.

Isoolefin-multiolefin interpolymers containing other interpolymerized monomers such as styrene, chlorostyrenes, acrylyl chloride, methallyl chloride, and other monoolefinic monomers may also be used.

HALOGENATING AGENTS

The "halogenating agents" which may be employed in the pratice of this invention include the halogenating agents set forth in patent art as for example those patents set forth heretofore regarding the halogenation of isoolefin-multiolefin interpolymers. Such halogenating agents include the halogens and mixed halogen compounds e.g. chlorine, bromine, bromine chloride, iodine chloride, iodine trichloride, iodine bromide, and the chlorine, bromine and iodine compounds of fluorine; hypochlorous acid and alkali metal salts thereof; halogen compounds of sulfur as chlorinating agents such as sulfuryl chloride, thionyl chloride; phosphorous pentachloride, antimony pentachloride, sodium hypochlorite; and like halogenating compounds. The "halogentating agents" including the alkyl (especially tertiary esters) of hypochlorous acid; N-chloramines with one or two chlorine atoms attached to the nitrogen, e.g., chloroanilide, 2,4-dichloroanilide, chloramine, N-chloro-p-nitroacetanilide, N-chlorosuccinimide N-chloroacetamide; monobromopyrocatechol, dibromosafrole; the N-monohalohydantoins and the N-dihalohydantoins which are represented by the following formula:

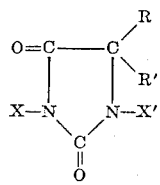

in which R and R' are hydrogen and/or alkyl, isoalkyl or aryl radicals, especially containing 1 to 12 carbon atoms and X and X' are hydrogen and/or halogen especially comprising chlorine or bromine. Such compounds include 1,3-dibromo - 5,5 - dimethyl hydantoin, 1,3-chlorobromo-5,5-dimethyl hydantoin, similar compounds in which one or both of the 5,5-methyl groups are substituted by the following groups including ethyl, propyl, butyl, isobutyl, amyl, isoamyl and the like; and pyridine, picoline, lutidine and collidine compounds having a positive halogen including the chlorine and bromine addition compounds thereof; the halogenated sulfonamides such as sodium p-toluene sulfonechloramide (Chloroamine-T), p-toluene sulfonedichloramide (Dichloramine-T); and like organic halogenating agents.

The isoolefin-multiolefin interpolymers as defined herein are halogenated with the aid of the halogenating agents as just set out including with or without solvent being present, the halogenation being conducted in the manner set forth in the examples or according with the known technical literature on halogenation of isoolefin-multiolefin interpolymers including the patent literature relating thereto cited heretofore.

With these partially halogenated isoolefin-multiolefin interpolymers is combined monomer material (defined hereafter under the heading Monomer Material) which is polymerized with the aid of a free-radical generating polymerization catalyst (defined hereafter), including with or without solvent present, to form the new interpolymers of this invention termed polymer modified partially halogenated isoolefin-multiolefin interpolymers.

MONOMER MATERIAL

The term "monomer material" employed to form the polymer modification of the halogenated isoolefin-multiolefin interpolymers of this invention include monomers having one or more polymerizable unsaturated carbon-to-carbon bond including such monomers as: *vinyl, vinylidene and allyl aromatic compounds* such as styrene, the vinyl toluenes, the methyl styrenes, the ethyl styrenes, the propyl styrenes, the vinyl biphenyls, the vinyl biphenyl ethers, the vinyl naphthalenes, and the like; the substituted vinyl, allyl or vinylidene aromatics including the alkyl, phenyl, alkoxy, phenoxy, acetyl, acylamino, isocyanate, carbamide, amido, amino, nitrile, carboxyamido, trifluoromethyl, phosphoro, and halo (F, Cl, Br) substituents including the mono, di, tri and tetra substituted styrenes, methyl styrenes, ethyl styrenes, isopropyl styrenes and the like monomers; *esters of olefinic acids including α and β substituted olefinic acids and including alkyl, cycloalkyl, alkenyl, aryl, aralkyl esters* such as the methyl, ethyl, propyl, butyl, isobutyl, pentyl, hexyl, cyclohexyl, phenyl esters of acrylic, methacrylic, ethacrylic, and the like; and including the α-haloacrylates such as methyl α-chloroacrylate, propyl α-chloroacrylate and the like; *the esters of olefinic alcohols with saturated acids,* such as allyl, methallyl, crotyl, 1-chloroallyl, 2-chloroallyl, vinyl, methylvinyl, and the like esters of saturated aliphatic and aromatic monobasic acids as vinyl and allyl acetate, isopropenyl acetate, vinyl formate, vinyl 2-ethyl hexoate, methyl vinyl acetate, vinyl and allyl propionate, vinyl and allyl benzoate, and the like; *the vinylalkyl esters of olefinic dicarboxylic acids* such as the vinyl alkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as vinyl ethyl-chloromaleate and the like; *olefinic acid esters of epoxy alcohols,* such as 2,3-epoxypropyl methacrylate or acrylate, glycidyl methacrylate, glycidyl acrylate, glycidyl crotonate, benzene vinyl monoepoxide and the reaction products of such with amines, as trimethyl amide and the like; *the olefinic halides,* such as vinyl fluoride, vinyl chloride, vinyl bromide, vinylidene fluoride, vinylidene chloride and the like; the *alkenyl ketones* such as methyl vinyl ketone, isopropenyl methyl ketone and the like; *the olefinic ethers* such as vinyl ethyl ether, vinyl butyl ether, vinyl cyclohexyl ether, vinyl phenyl ether, vinyl tolyl ether, vinyl benzyl ether and the like; *the olefinic aldehydes* such as acrolein, methacrolein, and the like; *the amino olefinic ethers* such as the amino vinyl ethers including aminoethylvinyl ether, aminopropylvinyl ether, N-methylaminoethylvinyl ether, N,N-diethylaminoethylvinyl ether and the like; *nitrogen containing esters of olefinic acids* such as aminocyclohexyl methacrylate triethanolamine monomethacrylate, β-piperidyl - N - ethyl methacrylate β - morpholine - N - ethyl methacrylate, N-methacrylyl morpholine, N-methacrylyl thiomorpholine, N-methacrylyl piperidines, N-acrylyl morpholine, N-acrylyl thiomorpholine, N-acrylyl piperidine and the like; *the quaternary ammonium monomers,* including methacryloxyethyltrimethylammonium methylsulfate and various quaternizing reaction products of quaternizing agents such as alkyl halides, alkyl sulfonates, alkyl phosphates and the like (e.g. methyl bromide and toluene sulfonate) with tertiary amine monomers such as β-dimethylaminoethyl methacrylate, methyl α-diethyl aminoacrylate, methyl α-(N-methylanilino)-acrylate, methyl α-dibenzylaminoacrylate, methyl α-distearyl amino acrylate and the like; *the monoolefinic triazine monomers* including triazine monomers in which one of the carbons of the triazine ring is attached to a vinyl, allyl radical or the like and the other carbons of the triazine are attached to cyano, halo (F, Cl, Br), amino, alkoxy, cycloaliphatic (e.g. cyclopentyl, cyclohexyl, etc.) aromatic-substituted (e.g. phenyl, biphenyl, naphthyl, etc.) alkylaryl (e.g. tolyl, xylyl, ethylphenyl, etc.) halogenated aromatic and the like; *the N-vinyl-N-alkylguanidines* such as N-vinyl-N-n-butylguanidine, N-vinyl-N-benzyl guanidine, acryloguanamine, methacryloguanamine and the like; *the N-vinyl monomers* such as N-vinylpyrrole, N-vinyl carbazole, N-vinylindole, N-vinyl succinimide and the like; N-vinyl lactams such as N-vinyl caprolactam, N-vinyl butyrolactam and the like; *the amides and substituted amides of acrylic acid and α- and β-substituted acrylic acids* such as acrylamide, methacrylamide, ethacrylamide, N-methacrylamide, N-methylmethacrylamide, N,N-bis (hydroxyethyl) acrylamide, N,N-diethylacrylamide, N,N-ethylmethylacrylamide and other mono- and di-N-substituted unsaturated acid amides where the substituent is alkyl $C_1$ to $C_5$ alkyl, alkoxy, haloalkyl and the like; *the olefinic nitriles* such as acrylonitrile, methacrylonitrile, ethacrylonitrile, chloroacrylonitrile and the like; *the fluoro-substituted nitriles of olefinic acids* such as N - (2,2,3 - trifluoroethyl) acrylamide, methacrylamide, N - (2,2 - difluoroethyl) acrylamide and methacrylamide; *the acylamino substituted acrylic and α- and β-acrylic acid esters* such as the methyl, ethyl, propyl and the like alkyl esters of α-acetoaminoacrylate, α-N-butyraminoacrylate and the like; *the vinyl pyridines* such as 2-vinyl pyridine, 3-vinylpyridine, 4-vinylpyridine, 2-vinyl-5-ethyl pyridine, 2-methyl-5-vinylpyridine and the other ethyl and methyl isomers of vinylpyridine and the like; *the vinyl heterocyclic compounds* such as 2-vinylfuran and 2-vinylthiophene and the like; *the silicon containing monomer* such as silicon tetra-acrylate, silicon tetramethacrylate, vinyltrichlorosilane and its hydrolysis products, the vinyl and allyl silicates and the like; *the phosphorus containing monomer* such as acrylic esters containing phosphonamido groups such as diamidophosphoroacrylate and the like and other similar polymerizable materials having a polymerizable unsaturated carbon-to-carbon bond.

The conjugated dienes include the following: *hydrocarbon conjugated dienes* such as butadiene-1,3, isoprene, 2,3 - dimethylbutadiene - 1,4, piperylene, pentadiene-1,3, 2 phenyl butadiene-1,3, and the like; *the polar conjugated dienes* such as 1- and 2-cyanobutadiene 1,3, 2-chlorobutadiene-1,3 and the like.

Monomer material having a plurality of polymerizable unsaturated carbon-to-carbon bonds at least two of which are non-conjugated, and include: *the polyunsaturated esters of olefinic alcohols and unsaturated monocarboxylic acids* such as the vinyl, vinylidene, and allyl esters of unsaturated monocarboxylic acids such as vinyl acrylate, allyl acrylate, the vinyl and allyl esters of α- and β-substituted acrylates such as vinyl methacrylate, vinyl crotonate, vinyl ethacrylate, allyl methacrylate, allyl ethacrylate, vinyl α-chloroacrylate, allyl α-hydroxyethyl acrylate, and the like; *the polyunsaturated esters of saturated dicarboxylic and polycarboxylic acids* such as the vinyl, vinylidene, allyl esters and mixed esters of such dicarboxylic acids as oxalic, malonic, succinic, glutaric, adipic, tartaric, citric, and the like; *polyunsaturated esters of unsaturated polycarboxylic acids,* such as the vinyl, vinylidene, and allyl esters and mixed esters of the unsaturated polycarboxylic acids such as maleic, citroconic itaconic, mesaconic, fumaric, muconic, chloromaleic, aconitic and the like including such monomers as diallyl fumarate, diallyl homophthalate, diallyl itaconic, diallyl ester of muconic acid, diallyl maleate, diallyl phthalate, diallyl isophthalate, diallyl terephthalate, and the like; *polyhydroxy esters of unsaturated acids* such as the glycol esters, glycol ether esters, the trihydroxy-, tetrahydroxy-, pentahydroxy-, hexahydroxy- esters including the glycerides, the pentoses, the hexoses esters of acrylic acid and α- and β-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, teraehylene glycol dimethacrylate and the like; *polyunsaturated acid amides* such as N,N-diallyl acrylamide, N,N-diallyl methacrylamide, N,N-methylene bisacrylamide and the like; *polyunsaturated ethers* such as divinyl ether, diallyl ether, divinyl carbitol, divinyl ether of diethylene glycol and the like; *polyunsaturated triazines,* the diallyl cyanurates, triallyl cyanurate, the di- and tri-vinyl cyanurates and derivatives of these and the like; *the polyalkene aryl compounds and derivatives* including the polyvinyl-, polyvinylidene- and polyallyl aryl compounds, such as divinyl benzene, trivinyl benzene, divinyl toluene, trivinyl toluene, divinyl xylene, divinyl ethyl benzene, divinyl biphenyl and divinyl biphenyl oxide, divinylnaphthalenes, divinyl methylnaphthalenes, and derivatives of these including those with alkyl, alkoxy, phenoxy, acetyl, isocyate, amino, nitrile, tirfluoro methyl, and halo (F, Cl, Br) groups and the like; and other monomers containing a plurality of vinyl, vinylidene, allyl, alkenyl and other polymerizable unsaturated double and triple bonds.

FREE-RADICAL GENERATING POLYMERIZATION CATALYSTS

The free-radical generating catalysts and catalyst systems which can be employed to polymerize monomer material include: *the inorganic peroxides* such as hydrogen peroxide and the like; the various *organic peroxy catalysts,* such as the dialkyl peroxides, e.g. diethyl peroxide, diisopropyl peroxide, dilauryl peroxide, dioleyl peroxide, distearyl peroxide, di-(tertiary-butyl) peroxide; di-(tertiary amyl) peroxide, dicumyl peroxide and the like; *the alkyl hydrogen peroxides* such as tertiary butyl hydroperoxide, tertiary amyl hydroperoxide, cumene hydroperoxide, tetralin hydroperoxide, and diisopropyl benzene hydroperoxide and the like; *the symmetrical diacyl peroxides,* for instance acetyl peroxide, propionyl peroxide, lauroyl peroxide, stearoyl peroxide, malonyl peroxide, succinoyl peroxide, phthaloyl peroxide, benzoyl peroxide; ketone peroxide such as methylethyl ketone peroxide, cyclohexanone peroxide, and the like; *the fatty oil acid peroxides,* such as cocoanut oil acid peroxides and the like; *the unsymmetrical or mixed diacyl peroxides,* such as acetyl benzoyl peroxide, propionyl benzoyl peroxide and the like; *the azo compounds* such as 2-azobis (isobutyronitrile), 2 azobis (2-methylbutyronitrile), 1 azobis (1-cyclohexancarbonitrile) and the like and other free radical generating catalysts employable in emulsion polymerization.

The higher temperature generating free radical organic catalysts can be employed at elevated temperatures with the sluggish monomers such as the allyl monomers.

The monomer material and the free-radical generating catalyst may be worked into the partially halogenated isoolefin-multiolefin interpolymer in an open mixer or on a rubber mill or other type of suitable mixer provided the monomers are not too volatile or this combination may be intermixed in a closed mixer especially where the monomers are volatile and the monomer material polymerized. The partially halogenated isoolefin-multiolefin, if not already in solution may be dissolved or dispersed in a solvent (defined hereinafter) and then combined with the monomer material and the free-radical generating polymerization catalyst and then the monomer material polymerized and such is preferably carried out in a suitable closed vessel or apparatus.

To produce the aqueous dispersions of this invention the polymer modified, partially halogenated isoolefin-multiolefin interpolymer is combined with water and with the aid of an emulsifier or dispersant (defined hereafter) is converted to the new aqueous dispersions of this invention. The process of dispersion is greatly facilitated if the modified interpolymer is dissolved or dispersed in solvent or solvent combination of which at least the water immiscible component is volatile before combining with the water and emulsifying agent.

By the term "emulsifier" or "dispersant" is meant those anionic, cationic and non-ionic emulsifiers suitable for emulsifying solutions and the partially halogenated interpolymers of this invention. Typical emulsifiers are given in the examples. It is important to keep the emulsifier concentration low and the examples have been so designed. About 10 percent by weight of emulsifier based on polymer content in practically all instances suffices and in most instances 5 to 6 or less percent by weight of emulsifier based on the polymer content is sufficient. One of the principal novelties of this invention resides in the discovery that the polymer modified partially halogenated isoolefin-multiolefin interpolymers can be emulsified from solution with low amounts of emulsifier and the solvent volatilized off with little or no precoagulum forming thus yilding a stable aqueous dispersion which in most instances can be concentrated to a high solids aqueous dispersion or latex.

The anionic emulsifiers employed in the examples include the alkali soaps of disproportionated rosin acids e.g. the potassium soap and the alkali soap of cocoanut fatty acids e.g. the potassium soap. While the soaps of fatty acids are useful especially when hydrogenated or saturated (as such do not rob the sulfur during curing); likewise ammonium casein solution is a useful emulsifier; and further hydrocarbon sulfonate emulsifiers and other organic sulfonate emulsifiers including the alcohol sulfonates as the alkali metal salts or ammonia or amine salts can also be employed e.g. the sodium salt of butyl-α-naphthalene sulfonic acid or the sodium salt of naphthalene sulfonic acid (Nacconol NRSF a trademark product), likewise other sulfonates can be employed such as the dioctyl ester of sodium sulfosuccinic acid (Aerosol OT a trademark product) and the like.

The cationic emulsifier employed in the examples was dodecylamine glycolate and likewise other primary, secondary, tertiary, and quaternary amine type emulsifiers may be employed e.g. the alkyl polyoxyethylene amines (Katapol PN–430 a trademark product) and the like.

The non-ionic emulsifier employable in the examples was a polyoxyethylated fatty alcohol and likewise other non-ionic emulsifiers may be employed.

One skilled in the art after having been taught by the examples set forth herein, will realize that certain anionic, cationic and non-ionic emulsifiers suitable for the emulsification of heavy hydrocarbon oils or hydrocarbon polymers or suitable for the emulsification of halogenated hydrocarbons can likewise be employed to emulsify the solutions of the partially halogenated interpolymers of this invention (see John W. McCutcheon's Fourth Revision of Synthetic Detergents and Emulsifiers set forth in December 1957, January, February, March and April 1958 issue of Soap and Chemical Specialties).

Further combinations of anionic and/or non-ionic emulsifier can be employed as well as combinations of cationic and/or non-ionic emulsifiers.

To increase the effectiveness of the emulsifier, suitable water soluble organic solvents can be employed in limited amounts including those water soluble solvents having one or more of the following groups hydroxyl, ether, carbonyl (including aldehyde and ketone) or combinations of these groups as for example, methyl, ethyl, or isopropyl alcohols, ethylene or propylene glycols, glycerin, hydroxyethyl ether, dioxane, methyl ethyl ketone, acetone and the like. These water soluble solvents are usually employed in amounts of more or less from 5–20% by weight based on the amount of solvent used to dissolve said isoolefin-multiolefin interpolymer or said partially halogenated isoolefin-multiolefin interpolymer. It is understood that the amount of water soluble solvent added must be less than the amount which will cause precipitation of said interpolymer from the solution of said interpolymer in the selected water immiscible solvent.

By the term "solvent" is meant the solvents suitable for dissolving or colloidally dispersing the isoolefinmultiolefin interpolymers and/or the partially halogenated isoolefin-multiolefin interpolymers of this invention. The solvents include methylene chloride, chlorobenzene, chloroform, carbon tetrachloride, carbon disulfide, benzene, toluene, the xylenes, cyclohexane, methyl cyclohexane and in some instances non-aromatic hydrocarbon solvents and the like and combinations of these solvents. Under the term "emulsifiers" or "dispersants" defined heretofore it was pointed out that water soluble solvents could be used in conjunction with the non-water miscible solvents set out above to aid in the dispersing action. It is to be understood that the term "solvent" as employed herein and in the appended claim is meant to include not only the water immiscible solvents for the interpolymers of this invention, as set forth heretofore but also the combination of these water immiscible solvents with minor proportions of the water miscible or water soluble solvents including those quantities referred to and set forth with the dispersants heretoforth.

The amount of solvent preferably employed is usually about 7 to 10 times the weight of polymer or halogenated polymer product employed, however, an emulsifiable viscosity being the limiting factor. While certain polar solvents including certain halogenated solvents and even certain petroleum solvents including aromatic solvents can be used, it has been the practice in the examples in most instances to employ benzene because of the ease of removal of benzene by volatilization.

The term "aqueous medium" means of course in water. It has been found that when the water employed is about equal to half the weight or less of the weight of solvent employed then stable aqueous dispersions result, that is, the solvent (e.g. benzene) is removable without the formation of precoagulum. Further in many instances such dispersions can be further concentrated to high solids latices 45 to 55 percent by weight or more of polymer solids.

While in the examples reduced pressures are used to remove the volatile solvent it has been found that steam can be passed into the emulsions with or without vacuum to remove the aqueously non-miscible solvent.

The processes set forth herein to prepare the polymer modified partially halogenated isoolefin-multiolefin interpolymers and the aqueous dispersions thereof include:

(a) *Monomer Material Solution Polymerized in the Presence of Partially Halogenated Isoolefin-Multiolefin Interpolymer (Step 1) and Aqueously Dispersed (Step 2)*

The selected partially halogenated isoolefin-multiolefin interpolymer is dissolved in solvent and monomer material added together with a free-radical generating catalyst and the monomer material permitted to polymerize (step 1) to produce the new solution of partially halogenated modified interpolymer then emulsifier is added and water added and agitated to emulsify and the solvent removed by volatilization to produce the new aqueous dispersion of partially halogenated modified interpolymer composition (step 2).

(b) *Partially Halogenated Isoolefin-Multiolefin Interpolymer Aqueously Dispersed (Step 1) and Monomer Material Aqueously Polymerized Therewith (Step 2)*

The selected partially halogenated isoolefin-multiolefin interpolymer is dissolved in a solvent then emulsifier added and water added and agitated to emulsify same and the solvent removed by volatilization to produce the new aqueous dispersion of the partially halogenated interpolymer (step 1) and then monomer material is added together with a free-radical generating catalyst and with agitation the monomer material permitted to polymerize, producing the new aqueous dispersion of partially halogenated modified interpolymer composition (step 2).

(c) *Isoolefin-Multiolefin Interpolymer Solution Halogenated (Step 1) Then Monomer Material Solution Polymerized Therewith (Step 2) Then Aqueously Dispersed (Step 3)*

The selected isoolefin-multiolefin interpolymer is dissolved in a solvent then a halogenating agent added and the interpolymer permitted to halogenate (step 1) followed by the addition of monomer material and a free-radical generating catalyst to polymerize the same and permitting the monomer material to polymerize (step 2) to form the new partially halogenated modified interpolymer then emulsifier is added and water added and agitated to emulsify same and the solvent removed by volatilization to produce the new aqueous dispersion of the partially halogenated modified interpolymer composition (step 3).

(d) *Isoolefin-Multiolefin Interpolymer Solution Halogenated (Step 1) and Aqueously Dispersed (Step 2) and Monomer Material Aqueously Polymerized Therewith (Step 3)*

The selected isoolefin-multiolefin interpolymer is dissolved in a solvent and halogenating agent added and the interpolymer permitted to halogenate (step 1) and emulsifier is added and water added and agitated to emulsify same and the solvent removed by volatilization to produce the new aqueous dispersion of the partially halogenated interpolymer (step 2) and monomer material added together with a free-radical generating catalyst and with the aid of agitation the monomer material polymerized to produce the new partially halogenated modified interpolymer composition (step 3).

(e) *Isoolefin-Multiolefin Interpolymer Solution Halogenated (Step 1) Then Monomer Material Solution Polymerized Therewith (Step 2) Then Aqueously Dispersed (Step 3) Then Monomer Material Aqueously Polymerized Therewith (Step 4)*

The selected isoolefin-multiolefin interpolymer is dissolved in a volatile solvent then solution halogenated (step 1) then monomer material added and polymerized with the aid of a free-radical generating catalyst (step 2), then emulsifier added and water added and agitated to emulsify same and the solvent removed by volatilization to produce the aqueous dispersion (step 3) then to the dispersion is added monomer material which is aqueously polymerized with the aid of a free-radical generating catalyst (step 4) to produce the new aqueous dispersion of the polymer modified partially halogenated interpolymer. Included hereunder are the aqueous interpolymer dispersions produced when step 2 precedes step 1 of the above process.

CONCENTRATION OF AQUEOUS DISPERSIONS OF HALOGENATED INTERPOLYMERS

The aqueous dispersions of halogenated interpolymers contain as prepared in the examples set forth hereinafter from 10 to 30 percent by weight polymer solids.

In some instances creaming agents commonly employed for natural rubber latex can be used to cream the aqueous dispersions of this invention, however, because of the small particle size (most of the aqueous dispersions of this invention are filterable through shark skin type filter paper) usually centrifuging is required in addition to the creaming agent to accomplish the creaming. Aqueous dispersions of the halogenated modified and unmodified interpolymers as set forth herein are easily prepared to 30–35 percent polymer solids by continuing the stripping operation after the solvent has been removed to remove a part of the water and by this method high solid latices of 50–60 percent solids can be obtained. The creaming agents employable herein include the sodium potassium or ammonium alginates, tragon seed gum, locust bean gum, konjaku flour, carragheen moss, agar-agar, pectin, gum tragacanth, karaya gum. Synthetic polyelectrolyte type polymers such as sodium, potassium or ammonium polyacrylates, methacrylates, copolymers of maleic anhydride and vinyls such as styrene, vinyl toluene etc. while not preferred can in some instances be employed. Especially suitable are the poly-vinyl alcohols and ethers, polyethylene oxides, methyl cellulose and like compounds. The amount of hydrophilic polymer creaming agent employed is from about 0.1 to 1.0 percent preferably about 0.3 percent by weight based on the water content of the dispersion being creamed. Most of the vegetable gums are best prepared for use by allowing them to swell for several hours in sufficient cold water to make a 2 to 3% solution and then heating to 60° C. while stirring until a clear solution is obtained usually ammonia is added to make the solution alkaline if such is to be employed with a dispersion prepared with an anionic emulsifier.

Dispersions prepared with cationic emulsifiers may be creamed with the natural occurring or synthetic non-ionic creaming agents as set out heretofore and in some instances may be creamed with a polyelectrolyte derived at least in part from basic polymerizable monomer material e.g. monomers having primary, secondary, or tertiary amine groups as for example the vinyl pyridine polymers which can be dissolved in aqueous solution with the aid of an acid such as glycolic acid may be used.

Creaming is usually aided by raising the temperature to about 60° C. and/or adjustment of the latex pH to about 10–11 with ammonium or potassium hydroxide, however, methyl cellulose gives better results when the latex is cold. The creamed products may separate satisfactorily otherwise centrifuging is employed by any suitable centrifuge such as the De Laval and Sharples machines.

The aqueous dispersions of the halogenated interpolymers hereof can be successfully concentrated to high solids by evaporation.

Further alternate examples to the examples hereof can in a like manner be prepared by adding (preferably to the water phase before solvent removal) a water soluble solvent in the amount of 10% by weight of the amount of water immiscible solvent used to dissolve or colloidally disperse the isoolefin-multiolefin interpolymer or partially halogenated isoolefin-multiolefin interpolymer and said water soluble solvent being either methyl alcohol, ethyl alcohol, isopropyl alcohol, ethylene glycol, propylene glycol, glycerine, methyl ethyl ketone, dioxane and the like. It is of course understood that amounts of the water soluble solvent can be less than or greater than 10% by weight based on the water immiscible solvent employed provided the amount used thereof does not precipitate the isoolefin-multiolefin interpolymer or the partially halogenated isoolefin-multiolefin interpolymer from the solution thereof being employed in these examples hereof to produce the aqueous dispersion.

Furthermore, these aqueous polymer solutions may be concentrated as herein described and according to the teachings of Example B-6 herein. The aqueous dispersions of the partially halogenated interpolymers hereof, may be latex compounded in a manner similar to the compounding of dry chlorinated and brominated butyl rubber as is set forth herein and as is known to those skilled in the art of compounding and vulcanizing halogenated elastomers.

COMPOUNDING OF AQUEOUS DISPERSIONS OF HALOGENATED INTERPOLYMERS

It is understood that the aqueous dispersions of the halogenated interpolymers as set forth in this invention may be combined with other aqueous dispersions such as those aqueous dispersions of polymer modified interpolymers set forth in copending U.S. application No. 626,762, filed December 6, 1956, and/or natural rubber latices and/or natural rubber latices modified by vinyl grafting to the natural rubber thereof and/or latices of derivatives of natural rubber and/or synthetic rubbers including conjugated diene-vinyl type synthetic rubbers, e.g. butadiene-styrene copolymers, butadiene-acrylonitrile copolymers etc.; and/or resin latices derived from monomer material having at least a polymerizable carbon to carbon bond e.g. the vinyl resin latices such as those prepared from styrene, the vinyl toluenes, the acrylate monomers, vinyl chloride, vinylidene chloride, the fluorine containing monomers, acrylonitrile etc.; and/or phenoplast aqueous dispersions or aqueous solutions and/or aminoplast aqueous dispersions or aqueous dispersions and/or aqueous dispersions of α-olefin polymers or copolymers e.g. polyethylene dispersions etc. and combinations of these. The latices hereof especially those polymer modified types can be prepared with selected monomer material so that such latices are compatible with the polymers of the other latices set forth above with which such latices are being admixed.

The polymer dispersions of this invention with or without other vulcanizable latices may be latex compounded, as set forth herein, and vulcanized to produce new vulcanizates including vulcanized foam sponges.

The latices produced according to this invention are particularly but not exclusively useful as latex dips for the coating of natural or synthetic fibres, such as silk, rayon, "nylon" and other sheer knitted hosiery. They may also be advantageously employed for treating a variety of textile and other fabric materials. Thus fabrics and other fibrous structures of wool, cotton, silk, glass and synthetic yarns or threads such as "nylon," rayon, polyester fibre (e.g. "Dacron"), polyacrylonitrile (e.g. "Orlon") and others, may be treated by dipping or the treating dispersions may be simply spread, brushed, or transferred to the fibrous material by a transfer roll.

The latices produced by the present invention may also be employed for the making of latex-cast articles, latex-foam articles, and for blending with other polymeric material or materials for producing polymer combinations of modified properties.

The latices of this invention, and combinations of those with other latices, before or after concentration, may be latex compounded for the production of vulcanizates therefrom, and the compounding ingredients employed may include colored pigments and the like when derived for decorative purposes.

When the aqueous dispersions of partially halogenated interpolymers with or without combinations with other latices are to be vulcanized then such aqueous dispersions are latex compounded and cured. The latex compounding ingredients may be of the following types: (1) amines suitable for curing halogenated polymers including the polyamines; (2) metal oxides e.g. zinc oxide or magnesium oxide cures; (3) sulfur cures with highly active accelerators suitable for curing butyl type elastomers including the tellurium accelerators; (4) the aminoplasts and phenoplasts including especially the resols; (5) radiation curing employing the radiation from radioactive materials or other radiation sources capable of cross-linking halogen containing polymers (such curing usually does not require the presence vulcanization aiding materials) and combinations of these methods.

The preparation of aqueous dispersions of various compounding ingredients is accomplished in conventional manners (see Royce J. Noble's treatise entitled "Latex in Industry," published in 1953 by Rubber Age, 250 West 57th St., New York City, N.Y., for methods of preparing latex compounding ingredients in aqueous dispersion).

Particularly suitable for compounding the interpolymers hereof including the aqueous dispersions thereof are the aminoplasts, phenoplasts, halogenated aminoplasts or phenoplasts and the halogenated unsaturated polymers.

The term "aminoplast" or "aminoplastic" is used in the same manner that C. P. Vale uses this term in his book entitled, "Aminoplastics," published in 1950 by Cleaner-Hume Press, Ltd., London, England. To form aminoplasts one can, for example, condense urea, melamine, thiourea or guanidine with an aldehyde such as formaldehyde or glyoxal and as catalyst either acid or alkaline condensation agents may be used. Thus 1 mole of urea may be condensed with two moles of formaldehyde with the aid of a small amount of acidic or alkaline condensing agents (U.S. Patent No. 1,355,834) forming the dimethylolurea and if this condensation is conducted in an alcohol solution etherification of the primary alcohol groups are promoted e.g. with butyl alcohol to produce the dimethylol dibutyl ether.

By the term "halo-aminoplasts" or "halogenated aminoplasts" is meant the amide-aldehyde condensates modified by etherification with a haloalcohol. Thus these halogenated phenoplasts include the urea, thiourea, toluene sulphonamide, ethylideneurea, melamine, guanidine and the like amides condensed (with or without the aid of a catalyst e.g. an acid or alkaline catalyst) with an aldehyde such as formaldehyde, paraformaldehyde, glyoxal, furfural, acrolein methacrolein, benzaldehyde, aldol and the like aldehyde and partially or completely etherified with a mono- or poly-halogenated, mono- or poly-hydric $C_2$ to $C_{22}$ alcohol, including the partially or completely chlorinated, brominated, chloro-brominated or hydroxy-chlorinated or hydroxy-brominated unsaturated alcohols such as lauroleyl myristoleyl, palmitoleyl, oleyl, gadoleyl, erucyl, linoleyl linolenyl, eleostearyl, ricinoleyl, arachidonyl, clupanodonyl, undecanleyl alcohols, and including such halogenated products of other unsaturated $C_2$ to $C_{22}$ alcohols e.g. chloroethanol (chlorohydrin), bromoethanol (bromohydrin), the chloropropanols, the bromopropanols, the chlorobutanols, the bromobutanol, and $C_5$ to $C_{22}$ homologues of these and the $C_2$ to $C_{22}$ hydroxy-chloro-ethers and the $C_2$ to $C_{22}$ hydroxy-bromo-ethers. These halogenated aminoplasts provide reactive halogens curable with metal oxiles amines etc. as set forth herein and are thus employable with the interpolymers of this invention and such combinations are new, unique and useful.

When latex compounding the aminoplasts and haloaminoplasts such may be emulsified (with or without aqueous miscible or aqueous non-miscible solvent present) with the aid of an emulsifier such as employed for the interpolymers hereof.

The term "phenoplast" or "phenoplastic" is used in the same manner as used by T. S. Carswell in his book entitled, "Phenoplasts, Their Structure, Properties and Chemical Technology," published in 1947 by Interscience Publishers, Inc., New York, N.Y. To form a phenoplast a substituted phenol such as cresol, a xylenol or resorcinol is reacted with an aldehyde such as formaldehyde, paraformaldehyde, glyoxal, furfural and the like aldehydes with or without the aid of an acid or basic catalyst. Particularly suitable for use with the interpolymers and aqueous dispersion of interpolymers of this invention are the phenoplasts known as "resols" which are phenol-aldehyde condensation products derived from phenol, hydrocarbon substituted phenols, bis-phenols, bis-phenol hydrocarbons, bis-(hydrocarbon substituted phenol) or bis-(hydrocarbon substituted phenol) hydrocarbons condensed with two molecules of aldehyde to form the corresponding dialcohols e.g. phenol dialcohol, bis-phenol-dialcohols etc. Thus phenol, p-cresol, p-ethyl-phenol, p-tert.-butyl phenol, p-tert.-amylphenol, p-tert.-octyl phenol, p-tert.-nonylphenol, p-phenyl phenol, p,p'-dihydroxy-diphenylmethane (bisphenol F), 4,4'-dihydroxy biphenyl, 4,4'-dihydroxy diphenyl dimethyl methane (bisphenol A), dihydroxy diphenyl sulfone and other long chain bisphenols and the like including in certain instances the ortho hydrocarbon substituted dihydroxy phenyls or the dihydroxy biphenyls which are formed by condensing such with two moles of aldehyde e.g. formaldehyde and these dimethylol derivates are referred to herein as "resols." These dialcohols of these phenols or resols are usually formed by reacting two moles of reactive aldehyde and one mole of these phenols with the aid of an alkaline or even a strong alkaline catalyst in the temperature range of about 25 to 100° C.

The term "resol" as used in this invention and as set out heretofore and hereafter is used in the same sense as used in the treatise by H. W. Chatfield entitled "Varnish Constituents," published in 1953 by Leonard Hill Ltd., London, England. The author states on pages 295 and 296:

"Oil-soluble (phenol-formaldehyde type) resins can be made either with acidic or basic catalysts.

"Acid catalysed resins are sometimes described as novolaks or resites; alkali catalysed resins are known as resols. The novolaks have no free reactive methylol groups and remain permanently fusible on further heating. Further condensation can, however, be effected by the addition of hardening agents.

"The resols contain free reactive methylol groups, and can be made to condense further, or harden by the simple application of heat, without the necessity of introducing hardening agents. The novolaks usually involve a slight molar excess of phenol, and the resols a slight molar excess of aldehyde.

"Generally speaking the resols usually possess better alcohol solubility and the novolaks better hydrocarbon solubility.

"Substitution in the benzene ring with hydrocarbon constituents in the ortho and para position is preferable to substituents in the meta position for oil solubility."

These resols, that is the biphenylalcohols or dialcohol phenols include for example the 4-hydrocarbon-2,6-dimethylol phenol, bis 2-(4 hydrocarbon-6-methylol phenol) methane, bis 4-(2 hydrocarbon-6-methylol phenol) methane, and the like in which the hydrocarbon radical is an alkyl, isoalkyl, phenyl, alkyl phenyl, cycloalkyl, alkyl cycloalkyl having a carbon range of 1 to 20 carbon atoms and preferably 3 to 20 carbon atoms. These dialcohols especially these dimethylols of phenol, hydrocarbon substituted phenols, biphenols and hydrocarbon substituted biphenols etc. are oil-soluble, heat reactive and self-condensing or self-curing. In combination with the aqueous dispersions of the interpolymers of this invention these dialcohols are employed while still aqueous alkali soluble or such may be heat treated and employed while still A-stage resins (resoles) referred to herein as "resols" or even the condensation may proceed until such are no longer aqueous alkali soluble even to the B-stage resins (resitol) referred to herein as "resols" provided such are dispersible in water with the aid of a water soluble organic solvent such as an alcohol e.g. ethanol or a ketone e.g., acetone or an ether, e.g. dioxane and/or the aid of an emulsifying agent.

The solvents employable in this invention to disperse the interpolymer hereof can include in addition to the water immiscible solvents set forth herein also in minor amount water miscible solvents having hydroxy, ether, aldehyde and ketone groups or combinations of these groups and these water soluble solvents can be employed to dissolve the "resols" and thus provide an easy manner of incorporating such resols with the interpolymers of this invention before or after such are dispersed in water with the aid of an emulsifying agent or before or after the water immiscible solvent is removed.

It is well known in the varnish trade that resols and resol esters react with unsaturated drying oils to make oil extended phenolic resins especially with the aid of basic catalyst such as basic oxides e.g. magnesium oxide, zinc oxide and the like, or with the aid of organic amines; or with the aid of organic acids or mineral acids or with the aid of acidic metal halides e.g. Friedel-Craft catalysts such as tin dichloride, zinc chloride, ferric chloride and the like.

In employing the resols and resol esters in combination with the partially halogenated isoolefin-multiolefin interpolymers of this invention basic catalyst can be employed when anionic and/or non-ionic emulsifiers are used to prepare the aqueous interpolymer dispersion hereof; and acidic catalyst can be employed when cationic and/or non-ionic emulsifiers are used to prepare the aqueous interpolymer dispersions.

Aldehydes in the presence of alkali will react with ketones. Thus aldol condensation products of formaldehyde and acetone or other ketones like ethyl methyl ketone may be employed, for example, with resorcinol to form the resol employable with the interpolymer of this invention.

The resols heretofore described may be esterified by reacting with acetic anhydride or other acid anhydrides in known manner and the resol esters employed in place of the resols herein or combinations of resols and resol esters may be employed. The resol esters are used in the same amounts as the resols are employed with the interpolymers hereof.

The "resols" are employed in amounts of from 0.2 to 25% or preferably from 0.5 to 20% based on the weight of the interpolymer content of the aqueous dispersion.

By the term "halogenated phenolic resins or phenoplast" or "halo-phenoplast" is meant the phenoplast including the resols prepared from alkyl substituted phenols in which one or more hydrogens of the $C_1$ to $C_{14}$ alkyl group thereof is substituted for a halogen group particularly a chlorine and/or bromine group. Further discussion and examples of these halogenated phenolic resins is set out hereafter.

By the term "halogenated unsaturated polymer" is meant those polymers prepared from conjugated halo-dienes such as 2-chlorobutadiene-1,3, 2-bromobutadiene-1,3 and the like e.g. the chloroprenes and further included under this term is meant the partially or completely halogenated unsaturated polymers including chloroprene, natural rubber, polybutadiene, conjugated diene-vinyl copolymers including butadiene-styrene, butadiene-vinyl toluene, butadiene-acrylonitrile, butadiene-acrylate copolymers and similar copolymers in which all or part of the butadiene is substituted by isoprene, piperylene and the like including the conjugated diene copolymers with the copolymerizable monomers included under the heading "monomer material" hereinbefore. Further discussion and examples of the halogenated unsaturated polymers is set out hereinafter.

EXAMPLES

The examples set forth hereafter have been arranged according to subheadings (a) through (d) employed heretofore.

A. *Examples of Monomer Material Solution Polymerized in the Presence of Partially Halogenated Isoolefin-Multiolefin Interpolymer (Step 1) and Aqueously Dispersed (Step 2)*

EXAMPLE A-1.—PARTIALLY BROMINATED BUTYL RUBBER REACTED IN SOLUTION WITH VINYL MONOMER E.G., ACRYLONITRILE

Partially brominated butyl (Hycar 2202) in the amount of 50 grams was cut into small pieces and was placed in a bottle and 500 grams of benzene added. The bottle and contents were rotated in a water bath at 60° C. over the week-end and the solution was then filtered and to this brominated butyl rubber (550 grams, 8.7% solids) solution was added 5 ml. of acrylonitrile and then 2 grams of benzoyl peroxide and after 12 hours at 60° C. no polymerization of the acrylonitrile took place so an additional 1 gram of benzoyl peroxide was added and the bottle and contents rotated another 10 hours at 60° C. resulting in 50% of the acrylonitrile polymerizing. In subsequent runs the brominated butyl rubber solution was freed of air by bubbling nitrogen therethrough and the catalyst adjusted to give complete polymerization of the acrylonitrile.

In a similar manner other monomers set forth herein under monomers may be interpolymerized with the partially halogenated isoolefin-multiolefin interpolymers to form new compositions of matter useful as coating materials and for other purposes.

EXAMPLE A-2.—VINYLATED PARTIALLY HALOGENATED BUTYL RUBBER AQUEOUS DISPERSION PREPARED WITH CATIONIC EMULSIFIER

The vinylated partially brominated butyl rubber solution prepared according to A-1 above was placed in a high speed mixer and was added 2 grams of dodecylamine and 1 gram of glycolic acid (70% purity) followed by 250 ml. of water and with or without 35 ml. of ethanol and such was emulsified. The emulsion was placed in a flask heated in a water bath at 70° C. and with the aid of vacuum the solvent and any residual acrylonitrile stripped off. A stable latex of vinylated partially brominated butyl latex resulted which can be concentrated according to the procedure set out hereafter.

EXAMPLE A-3.—VINYLATED PARTIALLY HALOGENATED BUTYL RUBBER AQUEOUS DISPERSION PREPARED WITH ANIONIC EMULSIFIER

The vinylated partially brominated butyl rubber solution prepared according to A-1 above was placed in a high speed mixer and was added 20 grams of a 12.5% solution of potassium soap of cocoanut fatty acids (150 grams of cocoanut oil fatty acids (Neofat No. 255, a trademark product) were combined with 50 grams of potassium hydroxide flakes and 1400 grams of water) followed by 250 ml. of water and emulsified. The emulsion was placed in a flask heated on a water bath to 70° C. and with the aid of vacuum stripped of solvent and any remaining monomers. A stable latex of the vinylated partially brominated butyl rubber resulted. This latex can be concentrated by the methods set out hereafter.

EXAMPLE A-4.—VINYLATED PARTIALLY HALOGENATED BUTYL RUBBER AQUEOUS DISPERSION PREPARED WITH NON-IONIC EMULSIFIER

The vinylated partially brominated butyl rubber solution prepared according to A-1 above was placed in a high speed mixer and was added 5 grams of polyoxyethylated fatty alcohol (Emulphor ON) followed by 250 ml. of water and emulsified. The emulsion was placed in a flask heated on a water bath to 70° C. and with the aid of vacuum stripped of solvent and any remaining monomer. A stable latex of vinylated partially brominated butyl rubber resulted. This latex can be concentrated by the methods set out hereinafter.

EXAMPLE A-5.—PARTIALLY CHLORINATED BUTYL RUBBER REACTED IN SOLUTION WITH VINYL MONOMERS E.G., ACRYLONITRILE

Partially chlorinated butyl rubber (Enjay MD-551) in the amount of 50 grams was cut into small pieces and was placed in a bottle with 500 grams of benzene and the bottle was rotated in a water bath at 60° C. and the solution was filtered. A bottle containing this solution was purged with nitrogen and 5 ml. of acrylonitrile and 3 grams of benzoyl peroxide was added and the bottle capped and rotated in a water bath at 60° C. for 24 hours during which time the vinyl monomer polymerized.

In a similar manner other polymerizable monomers as set forth herein under monomers may be interpolymerized with partially chlorinated butyl rubber and the products therefrom and solutions thereof are new compositions of matter.

EXAMPLE A-6.—VINYLATED PARTIALLY CHLORINATED BUTYL RUBBER AQUEOUS DISPERSION PREPARED WITH CATIONIC EMULSIFIER

The vinylated partially chlorinated butyl rubber solution prepared according to Example A-5 is converted to an aqueous dispersion with a cationic emulsifier in the same manner and with the same amounts of cationic emulsifier as taught in Example A-2 heretofore.

EXAMPLE A-7.—VINYLATED PARTIALLY CHLORINATED BUTYL RUBBER AQUEOUS DISPERSION PREPARED WITH ANIONIC EMULSIFIER

The vinylated partially chlorinated butyl rubber solution prepared according to Example A-5 is converted to an aqueous dispersion with an anionic emulsifier in the same manner and with the same amounts of anionic emulsifier as taught in Example A-3 heretofore.

EXAMPLE A-8.—VINYLATED PARTIALLY CHLORINATED BUTYL RUBBER AQUEOUS DISPERSION PREPARED WITH NON-IONIC EMULSIFIER

The vinylated partially chlorinated butyl rubber solution prepared according to Example A-5 is converted to aqueous dispersion with a non-ionic emulsifier in the same manner and with the same amounts of non-ionic emulsifier as taught in Example A-4 heretofore.

The aqueous dispersion of vinylated, partially halogenated butyl rubber prepared according to these Examples A-6, A-7 and A-8 may be concentrated according to the teachings set forth heretofore.

B. *Examples of Partially Halogenated Isoolefin-Multiolefin Interpolymer Aqueously Dispersed (Step 1) and Monomer Material Aqueously Polymerized Therewith (Step 2)*

EXAMPLE B-1.—PARTIALLY BROMINATED BUTYL RUBBER CONVERTED TO AN AQUEOUS DISPERSION EMPLOYING ANIONIC EMULSIFIER AND MONOMER MATERIAL AQUEOUSLY POLYMERIZED THEREWITH

In a glass jar was added 250 grams of brominated butyl rubber (Hycar 2202, see sales sheet on "Properties of Hycar American Rubbers," dated November 15, 1955, by the B. F. Goodrich Chemical Company, Cleveland, Ohio) cut into small pieces and then was added 2500 grams of benzene. The jar was capped and rotated overnight with the brominated butyl elastomer going into solution except for small dark sediment which was filtered off. In a high speed blender was added 200 g. of the filtered brominated butyl solution in benzene prepared as set forth above and 3 grams of the potassium soap of disproportionated rosin acids (Dresinate 731, a trademark product) dissolved in 60 ml. of water. The blender was allowed to run for ten minutes with the temperature rising and the benzene evaporating yielding an aqueous dispersion.

This aqueous dispersion was placed in a bottle purged of air with nitrogen and then was added the following: 1.5 ml. of methyl methacrylate, 0.5 ml. of cumene hydroperoxide, 0.1 ml. triethylene tetramine and the bottle was capped and placed in rotating water bath at 60° C. overnight and a methyl methacrylate polymer modified partially brominated butyl rubber interpolymer aqueous dispersion resulted which can be concentrated as set forth hereinafter. In place of the partially brominated butyl of this example one may employ other partially halogenated butyl elastomers e.g. the partially chlorinated butyl or partially bromochlorinated butyl elastomer. In place of the methyl methacrylate one may employ other monomers as set forth under monomer material herein.

EXAMPLE B-2.—PARTIALLY BROMINATED BUTYL RUBBER CONVERTED TO AQUEOUS DISPERSION EMPLOYING NON-IONIC EMULSIFIER AND MONOMER MATERIAL AQUEOUSLY POLYMERIZED THEREWITH

In this example the partially brominated butyl rubber was converted to an aqueous dispersion in the same manner as in Example B-1 heretofore except the 3 grams of the potassium soap of disproportionated rosin acids was replaced by 5 grams of polyoxyethylated fatty alcohol (Emulphor ON a trademark product) and an aqueous dispersion of the partially brominated butyl rubber resulted.

This aqueous dispersion was placed in a bottle purged with nitrogen and was added the following: 1 ml. of vinylidene chloride and 0.5 ml. of acrylonitrile, 0.3 ml. of diisopropyl benzene hydroperoxide and the bottle capped and rotated overnight in water bath at 60° C. There resulted an aqueous dispersion of a vinylated, partially brominated butyl rubber interpolymer which can be concentrated as set forth hereinafter. In a like manner other partially halogenated isoolefin-multiolefin interpolymers and other monomer material as set forth herein can be employed.

EXAMPLE B-3.—PARTIALLY BROMINATED BUTYL RUBBER CONVERTED TO AQUEOUS DISPERSION EMPLOYING CATIONIC EMULSIFIER

In this example the partially brominated butyl rubber was converted to an aqueous dispersion in the same manner as in Example B-1 heretofore except the 3 grams of the potassium soap of disproportionated rosin acids was was replaced by 3 grams of dodecylamine and 1.5 grams of glycolic acid (70% purity) and an aqueous dispersion of the partially brominated butyl rubber resulted.

This aqueous dispersion was placed in a bottle purged with nitrogen and the following added: 1.5 ml. of allyl methacrylate in which 0.4 gram of benzoyl peroxide was dissolved and the bottle was capped and rotated overnight in a water bath at 60° C. and allyl methacrylate polymer modified brominated butyl rubber interpolymer aqueous dispersion resulted.

EXAMPLE B–4.—PARTIALLY BROMINATED BUTYL RUBBER CONVERTED TO AN AQUEOUS DISPERSION EMPLOYING ANIONIC EMULSIFIER AND MONOMER MATERIAL AQUEOUSLY POLYMERIZED THEREWITH

To a glass bottle was added 20 grams of partially brominated butyl rubber (Hycar 2202) cut into small pieces with 200 grams of benzene. The bottle was then capped and rotated in a water bath at 60° C. overnight to afford solution thereof. The solution of brominated butyl rubber was then placed in a high speed mixer and 2 grams of cocoanut oil fatty acids (Neofat No. 255) as a potassium soap solution was added together with 100 grams of water and an emulsion produced. This emulsion was transferred to a flask heated to 70° C. in a hot water bath and the solvent and water removed with the aid of vacuum until the dry solids of the stable latex were 37.7% by weight.

This aqueous dispersion was placed in a bottle and purged with nitrogen then the following added: 0.1 ml. of methacrylic acid, 1.5 ml. of acrylonitrile, 0.4 ml. of cumene hydroperoxide and the bottle was capped and rotated overnight in a water bath at 60° C. and a vinylated, partially brominated butyl rubber interpolymer aqueous dispersion resulted.

EXAMPLE B–5.—PARTIALLY CHLORINATED BUTYL RUBBER CONVERTED TO AN AQUEOUS DISPERSION EMPLOYING ANIONIC EMULSIFIER AND MONOMER MATERIAL AQUEOUSLY POLYMERIZED THEREWITH

Partially chlorinated butyl rubber was converted to a latex as follows: 50 grams of chlorinated butyl rubber (Enjay MD-551 a trademark product reported to have a chlorine content of 1.1 to 1.3% by weight and an unsaturation content of 1–2% molar) was cut into small pieces and was dissolved at 60° C. in 500 ml. of benzene. This solution was placed in a high speed blender and was added 30 grams of a 12.5% solution of the potassium soap of cocoanut oil fatty acids (prepared as set forth under Example A–3 heretofore). The latex was placed in a flask in a hot water bath and the free benzene was stripped off together with water until an aqueous dispersion was obtained having 28.5% by weight solids. This latex was centrifuged in a laboratory centrifuge (International Equipment Co., Boston, Mass., Model SBV, size 1) for 10 minutes at 2100 r.p.m. The decanted top layer was an excellent latex of 48.8% dry solids. This high solids latex was placed in a bottle and purged with nitrogen then the following was added: 1 ml. of acrylonitrile and 0.3 gram of azobis-(isobutyronitrile) and the bottle capped and rotated overnight in a water bath at 50° C. and resulted an acrylonitrile polymer modified partially chlorinated butyl rubber interpolymer aqueous dispersion.

In a like manner monomer material may be added and polymerized therewith to the aqueous dispersions of partially halogenated interpolymer compositions which comprise dissolving in a solvent a partially halogenated isoolefin-multiolefin interpolymer or dissolving in a solvent an isoolefin-multiolefin interpolymer and adding a halogenating agent and halogenating same and then adding to the solution of these partially halogenated interpolymer water and emulsifying the same with the aid of an emulsifying agent as set forth in U.S. copending application No. 12,683, filed concurrently herewith, entitled "Aqueous Dispersions of Interpolymer Material and Uses Thereof."

CONCENTRATION OF AQUEOUS DISPERSIONS

The aqueous dispersions of the polymer modified halogenated interpolymers hereof, e.g. as prepared in the examples set out heretofore and hereafter, may be concentrated to high solid latices by three steps as follows: step (1), the solvent is vacuum stripped from the aqueous dispersion of the halogenated modified and unmodified interpolymer and the resulting latex is further concentrated by vacuum water stripping while heating the latex to about 60–95° C. that is, until the latex dry solids has reached 25–35% (this partial removal of water assures that the last traces of solvent are also removed); step (2), a creaming agent solution is prepared dissolving in water about 2–5% preferably about 3% of water soluble polymer to yield a highly viscous solution (the best creaming agents are those hydrophobic polymers giving the highest viscosity aqueous solution with the least polymer). The creaming agent solution is combined with the aqueous dispersion of halogenated modified or unmodified interpolymer hereof employing about 0.2 to 2.0% and preferably about 0.3% creaming agent based on the water phase of the aqueous dispersion being creamed. Adjusting the pH to the alkaline about 8–12 preferably about 10 for the interpolymer aqueous dispersions prepared by anionic emulsifier and about 2–4 preferably about 3 for the interpolymers prepared with cationic emulsifiers usually improves the creaming action. The creaming agent solution and the aqueous dispersion of halogenated modified or unmodified interpolymer hereof are then intimately mixed the pH is adjusted and the mixture aged about 8 to 48 hrs. preferably about 12 hrs. This aging process permits the creaming agent (the hydrophobic polymer) to diffuse into the aqueous medium of the interpolymer aqueous dispersion. In some cases aging alone with aid of some heat if necessary will cause creaming, however, it is preferred to resort to the aid of centrifuging step (3) hereof. When the proper creaming agent is chosen the centrifuged creamed product will be a latex of about 50–60% dry solids or more.

Table I teaches methods of concentrating the various polymer modified, partially halogenated isoolefin-multiolefin interpolymer aqueous dispersions prepared heretofore.

TABLE I.—PREPARATION OF HIGH SOLIDS LATICES BY CREAMING AQUEOUS DISPERSION OF POLYMER MODIFIED HALOGENATED INTERPOLYMER

| Example No. B–6 | A | B | C | D | E | F | G |
|---|---|---|---|---|---|---|---|
| Creaming agent—Hydrophilic polymer: | | | | | | | |
| Polyacrylamide,[1] g | 0.2 | | | | | | |
| Polyethylene oxide,[2] g | | 0.2 | | | | | |
| Tragacanth gum, g | | | 0.2 | | | | |
| Sodium polyacrylate,[3] g | | | | 0.2 | | | |
| Sodium alginate, g | | | | | 0.2 | | |
| Methoxycellulose,[4] g | | | | | | 0.2 | |
| Polyethylene oxide,[5] g | | | | | | | 0.2 |
| Water, ml | 7 | 7 | 7 | 7 | 7 | 7 | 10 |
| Time for solution, hrs | 12 | 12 | 12 | 12 | 12 | 12 | 12 |
| Halogenated polymer latex (28.5% dry solids): | | | | | | | |
| Latex type | A–2 | A–3 | A–4 | A–7 | B–4 | B–5 | B–5 |
| Amount (latex) ml | 100 | 100 | 100 | 100 | 100 | 100 | 100 |
| Intimately mixed | x | x | x | x | x | x | x |
| Aged, hrs | 12 | 12 | 12 | 12 | 12 | 12 | 12 |
| Centrifuged | x | x | x | x | x | x | x |
| Creamed latex: Dry solids, percent wt | 50 to 65 | | | | | | |

[1] Polyacrylamide 200.
[2] Carbopol 934.
[3] Sodium polyacrylate.
[4] Cellosize WP-4400.
[5] Polyox WSR-301.

C. *Examples of Isoolefin-Multiolefin Interpolymers Solution Halogenated (Step 1) Then Monomer Material Solution Polymerized Therewith (Step 2) Then Aqueous Dispersed (Step 3)*

EXAMPLES C1–6.—SOLUTION HALOGENATED AND VINYLATED BUTYL RUBBER AQUEOUSLY DISPERSED

Examples C–1 through Examples C–6 set out in Table II hereafter teach that butyl rubber in solution may be partially halogenated then vinylated. The polymers, polymer solution, and aqueous polymer dispersions of partially halogenated and vinylated butyl rubbers are new per se and such latices can be concentrated by the procedures set forth in Example B-6 heretofore to obtain high solids latices.

TABLE II.—SOLUTION HALOGENATION AND VINYLATION OF BUTYL RUBBER AND AQUEOUS DISPERSION THEREOF

| Example C | 1 | 2 | 3 | 4 | 5 | 6 |
|---|---|---|---|---|---|---|
| Isoolefin-multiolefin interpolymer: | | | | | | |
| GR-I 17,[1] g | 50 | | | | | |
| GR-I 15,[2] g | | 50 | | | | |
| Polysar (101),[3] g | | | 50 | 50 | | |
| Polysar (XPRD-759),[4] g | | | | | 50 | 50 |
| Solvent and conditions: | | | | | | |
| Benzene, g | 500 | 500 | 500 | 500 | 500 | 500 |
| Dissolved, °C | 60 | 60 | 60 | 60 | 60 | 60 |
| Dissolved, hrs | 12 | 12 | 12 | 12 | 12 | 12 |
| Halogenating agent: | | | | | | |
| Bromine, g | 0.2 | | 0.1 | | | |
| Chlorine, g | | 0.2 | 0.2 | | | |
| N,N'-dibromo-5-dimethyl hydantoin, g | | | | 0.3 | | |
| N,N'-dichloro-5-dimethyl hydantoin, g | | | | | 0.3 | |
| N,N'-chloro bromo-5 dimethyl hydantoin, g | | | | | | 0.3 |
| Heat, 60° C., 4 hrs | | | | x | x | x |
| Temp., °C | 0 | 0 | 0 | | | |
| Monomers: | | | | | | |
| Thiomaleic acid, g | 1 | | | | | |
| Maleic anhydride, g | | 1 | | | | |
| Acrylonitrile, g | 2 | | 2 | 1 | 2 | 1 |
| Methacrolein, g | | | | 1 | | 1 |
| Styrene, g | | 2 | | | | |
| Vinyl chloride, g | | | | 1 | | |
| Vinylidene fluoride, g | | | | | 1 | |
| Catalyst and conditions: | | | | | | |
| Benzoyl peroxide, g | 1.5 | 1.5 | 1.5 | | | |
| Cumene hydroperoxide, g | | | | 1.5 | 1.5 | 1.5 |
| Triethylene tetramine, g | | | | 0.5 | 0.5 | 0.5 |
| Polymerization temp., °C | 80 | 80 | 80 | 40 | 40 | 40 |
| Polymerization time, hrs | 12 | 12 | 12 | 12 | 12 | 12 |
| Emulsifying agent: | | | | | | |
| Potassium laurate, g | 2.5 | | | | | |
| Dodecylamine glycolate, g | | 2.5 | | | | |
| Dodecyl ester of sodium sulfosuccinic acid,[5] g | | | 2.5 | | | |
| Potassium soap of disproportionated rosin acids,[6] g | | | | 3 | | |
| Sodium salt of naphthalene sulfonic acid,[4] g | | | | | 2.5 | |
| Polyoxyethylated fatty alcohol,[8] g | | | | | | 3 |
| Water, ml | 250 | 250 | 200 | 200 | 200 | 200 |
| Water soluble solvent:[9] | | | | | | |
| Isopropanol, ml | | | 30 | | | |
| Dioxane, ml | | | | 25 | | |
| Methyl ethyl ketone, ml | | | | | 35 | |
| Ethylene glycol, ml | | | | | | 30 |
| Emulsify (high speed blender) | x | x | x | x | x | x |
| Vacuum strip solvent, 70° C | x | x | x | x | x | x |
| Aqueous dispersion | x | x | x | x | x | x |

[1] Interpolymer of 97.5% isobutylene and 2.5% isoprene, antioxidant PBNA, Mooney Viscosity 68.
[2] Interpolymer of 97.5% isobutylene and 2.5% isoprene, antioxidant PBNA, Mooney Viscosity 46.
[3] An antioxidant free butyl rubber of low unsaturation.
[4] An antioxidant free butyl rubber.
[5] Aerosol O.T., a trademark product.
[6] Dresinate 731, a trademark product.
[7] Daxad 11, a trademark product.
[8] Emulphor ON, a trademark product.
[9] The water soluble solvent while beneficial can be eliminated especially if more water is employed.

D. *Examples of Isoolefin-Multiolefin Interpolymer Solution Halogenated (Step 1) and Aqueously Dispersed (Step 2) and Monomer Material Aqueously Polymerized Therewith (Step 3)*

EXAMPLES D1–6.—SOLUTION HALOGENATION OF BUTYL RUBBER AQUEOUS DISPERSION AND VINYLATION

In Examples D-1 through D-6 as set forth in Table III hereafter comprise butyl rubbers which were dissolved in a solvent and partially halogenated and then with the aid of anionic, cationic and non-ionic emulsifiers emulsified and with the aid of heat and vacuum stripping thus being converted into aqueous dispersions. To these latices were then added monomer materials which were polymerized with the aid of a free-radical catalysts which resulted in aqueous dispersions of partially halogenated, monomer treated (vinylated) isoolefin-multiolefin interpolymers. These new latices can be concentrated by the methods set out under B-6 heretofore.

TABLE III—BUTYL RUBBER SOLUTION HALOGENATED AQUEOUSLY DISPERSED AND AQUEOUSLY VINYLATED

| Example D | 1 | 2 | 3 | 4 | 5 | 6 |
|---|---|---|---|---|---|---|
| Isoolefin-Multiolefin interpolymer: | | | | | | |
| Butyl rubber [1] | | | | | | |
| Polysar (XPRD-759), g | 50 | 50 | 50 | | | |
| Polysar (101), g | | | | 50 | 50 | 50 |
| Solvent and conditions: | | | | | | |
| Benzene, g | 500 | 500 | 500 | 500 | 500 | 500 |
| Dissolved, °C | 60 | 60 | 60 | 60 | 60 | 60 |
| Dissolved, hrs | 12 | 12 | 12 | 12 | 12 | 12 |
| Halogenating agent: | | | | | | |
| Chlorine, g | 0.6 | 0.4 | | | | |
| Bromine, g | | | 0.5 | | | |
| N,N'-dibromo-5-dimethyl hydantoin, g | | | | 0.8 | | |
| N,N'-dichloro-5-dimethyl hydantoin, g | | | | | 0.6 | |
| N,N'-chlorobromo-5-dimethyl hydantoin, g | | | | | | 0.6 |
| Heat, 60° C., 4 hrs | | | | x | x | x |
| Temp., °C | 0 | 0 | 0 | | | |
| Emulsifying agent: | | | | | | |
| Sodium laurate, g | 2.5 | | | | | |
| Potassium laurate, g | | 2.5 | | | | |
| Dodecyl ester of sodium sulfosuccinic acid,[2] g | | | 2.5 | | | |
| Sodium salt of naphthalene sulfonic acid,[3] g | | | | 2.5 | | |
| Polyoxyethylated fatty alcohol, [4] g | | | | | 3 | |
| Dodecyl amine glycolate, g | | | | | | 2.5 |
| Water, ml | 250 | 250 | 200 | 200 | 200 | 180 |
| Water soluble solvent: 5 | | | | | | |
| Ethanol, ml | | | 35 | | | |
| Methyl ethyl ketone, ml | | | | 25 | | |
| Acetone, ml | | | | | 30 | |
| Glycerine, ml | | | | | | 25 |
| Emulsify (high speed blender) | x | x | x | x | x | x |
| Vacuum strip solvent at 70° C | x | x | x | x | x | x |
| Aqueous dispersion | x | x | x | x | x | x |
| Monomers: | | | | | | |
| Hydroxyethylacrylate, g | 3 | 1 | | | | |
| Acrylonitrile, g | | 2 | | | | |
| Acrylamide, g | | | 1 | | | |
| 4-vinylpyridine, g | | | | 2 | | |
| N-diethylaminoethyl methacrylate, g | | | | | 2 | |
| Isopropenyl methyl ketone, g | | | | | | 2 |
| Vinyl chloride, g | | | | 1 | | |
| Vinyl fluoride, g | | | | 0.5 | | |
| Catalyst and conditions: | | | | | | |
| Benzoyl peroxide, g | 1.5 | 1.5 | 0.5 | | | |
| Cumene hydroperoxide, g | | 0.5 | 0.25 | | | |
| Triethylene tetramine, g | | | 0.5 | | | |
| Azobis-(isobutyronitrile), g | | | | 1.5 | 1.5 | 1.5 |
| Polymerization temp., °C | 80 | 80 | 40 | 60 | 60 | 60 |
| Polymerization time, hrs | 12 | 12 | 12 | 12 | 12 | 12 |

[1] See table II.
[2] Aerosol O.T., a trademark product.
[3] Doxad 11, a trademark product.
[4] Emulphor ON, a trademark product.
[5] The water soluble solvent can be eliminated.

E. *Isoolefin-Multiolefin Interpolymer Partially Halogenated and Polymer Modified Is Aqueously Dispersed and Further Polymer Modified*

Table IV, Examples E-1 through E-5, an isolefin multiolefin interpolymer is halogenated then monomer material is solution polymerized therewith with the aid of a free-radical generating catalyst and to the resulting interpolymer is added water and an emulsifying agent and after emulsification the aqueous immiscible solvent removed and further monomer material added and polymerized with the aid of a free-radical generating polymerization catalyst to give the aqueous dispersion of the polymer modified interpolymer.

TABLE IV.—AQUEOUS DISPERSION OF PARTIALLY HALOGENATED ISOOLEFIN-MULTIOLEFIN INTERPOLYMER POLYMER MODIFIED BEFORE AND AFTER AQUEOUS DISPERSION.

| Example E | 1 | 2 | 3 | 4 | 5 |
|---|---|---|---|---|---|
| Isoolefin-multiolefin interpolymers (solution): [1] | | | | | |
| Butyl rubber [1] | | | | | |
| Polysar (XPRD-759),[2] g | 50 | 50 | 50 | 50 | 50 |
| Solvent and conditions: | | | | | |
| Benzene, g | 500 | 500 | 500 | 500 | 500 |
| Dissolved °C | 60 | 60 | 60 | 60 | 60 |
| Dissolved, hrs | 12 | 12 | 12 | 12 | 12 |
| Step 1 (halogenation), halogenating agent: [3] | | | | | |
| Chlorine, g | 0.2 | 0.2 | 0.2 | | 0.2 |
| Bromine, g | | | | 0.2 | |
| Step 2 (monomer addition and polymerization), monomer: [4] | | | | | |
| Acrylonitrile, g | 2 | 2 | 2 | | 1 |
| Methyl methacrylate, g | | | | 2 | 1 |
| Catalyst and conditions: | | | | | |
| Cumene hydroperoxide, g | 1.0 | 1.0 | 1.0 | 1.0 | 1.0 |
| Triethylene tetramine, g | 0.5 | 0.5 | | 0.5 | 0.5 |
| Polymerization temp., °C | 40 | 40 | 60 | 40 | 40 |
| Polymerizatiln time, hrs | 12 | 12 | 12 | 12 | 12 |
| Step 3 (conversion to aqueous dispersion), emulsifying agent: [5] | | | | | |
| Potassium laurate, g | 2.5 | 2.5 | 2.5 | | 2.5 |
| Dodecylamine glycolate, g | | | | 2.5 | |
| Water, ml | 250 | 250 | 200 | 200 | 200 |
| Water soluble solvent: [6] | | | | | |
| Isopropanol, ml | | | 20 | | |
| Ethyl methyl ketone, ml | | | | 25 | |
| Glycerine, ml | | | | | 20 |
| Emulsify (high speed mixer) | x | x | x | x | x |
| Vacuum strip solvent, 70° C | x | x | x | x | x |
| Aqueous dispersion formed | x | x | x | x | x |
| Step 4 (monomer addition and polymerization),[2] monomer: [4] | | | | | |
| Acrylonitrile, g | 2 | 2 | 2 | | 1 |
| Methyl methacrylate, g | | | | 2 | 1 |
| Catalyst and conditions: | | | | | |
| Cumene hydroperoxide, g | 1.0 | 1.0 | 1.0 | 1.0 | 1.0 |
| Triethylene tetramine, g | 0.5 | 0.5 | 0.5 | 0.5 | 0.5 |
| Polymerization temp., °C | 40 | 40 | 40 | 40 | 40 |
| Polymerization time., °C | 12 | 12 | 12 | 12 | 12 |

[1] Other isoolefin-multiolefin interpolymers and solvents may be employed as set forth herein.
[2] Butyl rubber.
[3] Other halogenation agents may be employed as set forth herein.
[4] Other monomers may be employed including monomers selected from those set forth under monomer material herein.
[5] Other emulsifying or dispersing agents suitable for the dispersion of these interpolymers may be employed.
[6] Water soluble solvent can be eliminated especially if water is increased

VULCANIZATION RECIPES

The new aqueous dispersions of polymer modified partially halogenated interpolymers hereof can be latex compounded by recipes set forth in Tables V and VI hereafter. For aqueous compounding of the aqueous dispersions hereof the compounding ingredients are prepared as aqueous dispersion by grinding with the aid of a dispersing agent (5 percent or less dispersing agent based on dry weight of material being dispersed) such as the polymerized sodium salt of alkyl napthalene sulfonic acid (Daxad II), isooctyl phenyl polyethoxy ethanol (Triton X-100) dioctyl ester of sodium sulfosuccinic acid (Aerosol OT), alkyl aryl sulfonate (Nacconol NR) and other dispersing agents suitable for dispersing compounding ingredients for latex compounding.

While most of the latices in Tables V and VI are not concentrated it is preferred to use the concentrated latices with polymer solids exceeding 50% by weight of the aqueous dispersions.

The resols employed in Table VI are described in more detail in Table VII hereafter. One skilled in the art of compounding halogenated polymers will realize that numerous variations can be made including substitutions of other curing ingredients.

TABLE V.—COMPOUNDING RECIPES [1]

| Example F | 1 | 2 | 3 | 4 | 5 | 6 | 7 | 8 | 9 | 10 |
|---|---|---|---|---|---|---|---|---|---|---|
| Aqueous dispersion of polymer modified halogenated interpolymer (dry solids basis): | | | | | | | | | | |
| Latex A-2, g | 100 | | | | | | | | | |
| Latex A-2, g | | 100 | | | | | | | | |
| Latex A-4, g | | | 100 | | | | | | | |
| Latex A-6, g | | | | 100 | | | | | | |
| Latex B-1, g | | | | | 100 | | | | | |
| Latex B-2, g | | | | | | 100 | | | | |
| Latex B-3, g | | | | | | | 100 | | | |
| Latex B-4, g | | | | | | | | 100 | | |
| Latex B-5, g | | | | | | | | | 100 | |
| Latex B-6B, g | | | | | | | | | | 100 |
| Aqueously dispersed compounding ingredients (dry solids basis): | | | | | | | | | | |
| Zinc oxide, g | 5 | 5 | 5 | 4 | | 5 | | 5 | 5 | |
| Mercaptobenzothiazole, g | 0.5 | | 0.5 | 0.5 | | | | | 1.0 | |
| Tetraethylthiuram disulfide, g | 1.5 | | 2 | 0.5 | | | | 1.0 | | |
| Sulfur, g | 2 | | 2 | 2 | | 2 | | 2.2 | 2.2 | 5 |
| Lead dioxide, g | | 2 | | | 5 | | | | | 1.5 |
| Quinone dioxime, g | | 2 | | | 2 | | | | | 4 |
| Benzothiazyl disulfide, g | | 4 | | | 4 | | | | | |
| Magnesium oxide, g | | | | | 2 | | 5 | | | |
| Cumar resin, g | | | | | 5 | | | | | |
| Tellurium diethyl dithiocarbamate, g | | | | | | | 1.5 | 0.5 | | |
| Diethyl triamine, g | | | | | | | | 2 | | 2 |
| Tetraethyl thiuram monosulfide, g | | | | | | | | | 0.5 | |
| Dispersing agent for compounding ingredients (per 100 g. thereof): | | | | | | | | | | |
| Anionic,[2] g | | 5 | | | 5 | | | 5 | 5 | 5 |
| Non-ionic,[3] g | | | 6 | | | 6 | | | | |
| Cationic,[4] g | 5 | | | 5 | | | 5 | | | |
| Vulcanization conditions of dried product: | | | | | | | | | | |
| Temp., °F.[5] | | | | | 300–350 | | | | | |
| Time, min | | | | | 30–60 | | | | | |

[1] These recipes are applicable to compounding of the solid interpolymers hereof except that the dispersing agents are unnecessary.
[2] Triethanolamine soap of cocoanut fatty acids.
[3] Polyoxyethylated fatty alcohol (Emulphor ON).
[4] Dodecylamine glycolate.
[5] With certain of these curing systems, especially those containing amines, lower curing temperatures such as 212° F. can be employed or even room temperature curing.

TABLE VI.—COMPOUNDING RECIPES [1]

| Example G | 1 | 2 | 3 | 4 | 5 | 6 | 7 | 8 | 9 |
|---|---|---|---|---|---|---|---|---|---|
| Aqueous dispersion of polymer modified halogenated interpolymer (dry solids basis): | | | | | | | | | |
| Latex C-1, g | 100 | | | | | | | | |
| Latex C-2, g | | 100 | | | | | | | |
| Latex C-5, g | | | 100 | | | | | | |
| Latex D-4, g | | | | 100 | | | | | |
| Latex D-5, g | | | | | 100 | | | | |
| Latex D-6, g | | | | | | 100 | | | |
| Latex E-3, g | | | | | | | 100 | | |
| Latex E-4, g | | | | | | | | 100 | |
| Latex E-5, g | | | | | | | | | 100 |
| Natural Rubber Latex (dry basis), g | | | | | | | | | 25 |
| Phenolic Resin [2] VII | A | B | C | D | E | F | G | G | G |
| Resol, g | 8 | 10 | 6 | 12 | 18 | 6 | 3 | 2 | 2 |
| Aqueous dispersed compounding ingredients (dry solids basis): | | | | | | | | | |
| Benzothiazyl disulfide, g | 1 | | | | | | | | 0.5 |
| Tellurium diethyl dithiocarbamate, g | 1 | | | | | | | | |
| Sulfur, g | 1.5 | | | | | | 2 | 1 | |
| Zinc oxide, g | 5 | | | | | | 4 | 4 | 7.5 |
| Stannous chloride, g | | 2 | | | | | | | |
| Glycolic acid, g | | | 2 | | | | | | |
| Diethylene triamine, g | | | | 4 | | 2 | | | |
| Zinc chloride, g | | | | | 1.5 | | | | |
| Formaldehyde, g | | | | | | 2 | | | |
| 2-Mercaptobenzothiazole, g | | | | | | | 1 | 0.5 | |
| Tetraethylene thiuran disulfide, g | | | | | | | 1.5 | 0.4 | |
| Magnesium oxide, g | | | | | | | | 2 | |
| Tetraethyl thiuram monosulfide, g | | | | | | | | | 0.25 |

AQUEOUS DISPERSION COMPOUNDS

| Dispersing agent for compounding ingredients (per 100 g. thereof): | | | | | | | | | |
|---|---|---|---|---|---|---|---|---|---|
| Anionic,[3] g | 5 | | | 5 | | | 5 | | 5 |
| Non-ionic,[4] g | | | 6 | | 6 | | | 5 | |
| Cationic,[5] g | | 5 | | | | 5 | | 5 | |
| Vulcanization conditions of dried products: | | | | | | | | | |
| Temp., °F.[6] | colspan: 300–350 |
| Time, min | colspan: 30–60 |

[1] These receipts are applicable to compounding of the solid interpolymer hereof except that the dispersing agents are unnecessary.
[2] The resols, if necessary, may also be dispersed with 5% by weight or more of the dispersing agent employed to disperse the compounding ingredients hereof.
[3] Potassium soap of cocoanut fatty acids.
[4] Polyoxyethylated fatty alcohol (Emulphor ON).
[5] Dodecylamine glycolate.
[6] With certain of these curing systems, especially those containing amines, lower curing temperatures such as 212° F. can be employed or even room temperature curing.

TABLE VII.—RESOL COMPOSITION

| Resol III | A | B | C | D | E | F | G |
|---|---|---|---|---|---|---|---|
| Phenol (moles): | | | | | | | |
| Bisphenol A | 1 | | | | | | |
| Bisphenol F | | 1 | | | | | |
| 4,4'-dihydroxy biphenyl | | | 1 | | | | |
| p-Tert.-phenyl phenol | | | | 1 | | | |
| p-Tert.-nonyl phenol | | | | | 1 | | |
| p-Tert.-octyl phenol | | | | | | 1 | |
| p-Tert.-butyl phenol | | | | | | | 1 |
| Aldehyde (moles): | | | | | | | |
| Formaldehyde | 2.1 | 2.1 | 2.3 | 2.2 | 2.2 | 2.3 | 2.1 |
| Alkali (moles): Sodium hydroxide | 2 | 2 | 2 | 1 | 1 | 1 | 1 |
| Reaction temp.,° C | colspan: 50–75 |
| Neutralize | x | x | x | x | x | x | x |
| Solvent (moles): | | | | | | | |
| Acetone | | | | 5 | | | |
| Ethanol | | | | | 8 | | |
| Methyl ethyl ketone | | | | | | 6 | |
| Dioxane | | | | | | | 5 |

In place of the phenolic resins (resols) employed in Examples G-1 through G-9, Table VI heretofore, other alkylated phenol-formaldehyde resins in stage A or stage B may be employed including the primary and secondary as well as the tertiary $C_1$ through $C_{14}$ alkylated phenol-aldehyde resins including the aldehyde resins from alkylated phenols, alkylated with propylene, propylene dimer, propylene trimer, isobutylene, isobutylene dimer and isobutylene trimer and the like: which includes the resols of these $C_1$ to $C_{14}$ alkylated phenols and the like; further included are the aldehyde resins, e.g. formaldehyde resins of $C_1$ to $C_{14}$ alkylated phenols in which one or more hydrogens of the alkyl groups are substituted by a halogen group including fluoro, chloro, bromo or iodo groups preferably with the chloro or bromo group or combinations of these groups and this especially includes the chloromethyl and/or bromomethyl alkylated phenols in which the alkyl group contains $C_1$ to $C_{14}$ carbons and including the resols thereof. For example the aldehyde resins, especially the formaldehyde resins from p-(chloro-isobutyl) phenols, p-(bromo-isobutyl) phenols, p-(chloro-diisobutyl) phenols, p-(bromo-diisobutyl) phenols and homologues of these. Like the phenolic resins the halogenated phenolic resins may be employed in this invention in the A stage or in the B stage.

Thus the halogenated phenolic resins especially the chlorinated and/or brominated phenolic resins provide halogen groups which can aid in the curing of the polymer modified, partially halogenated isoolefin-multiolefin interpolymers of this invention.

In place of the phenolic resins (resols) employed in Examples G-1 through G-9 of Table VI heretofore one may employ in about the same quantities as set forth in the examples on aminoplasts as for example the condensation products of one mole of urea and two moles of formaldehyde modified to improve solubility in hydrocarbons by introduction of a suitable aliphatic alcohol into the urea-formaldehyde product and the alcohols which are suitable for this purpose include butyl, isobutyl, amyl, octyl, nonyl, capryl, dicyl, tridecyl and higher alcohols. Similar products prepared from thiourea can likewise be employed together with the aldehyde and alcohols.

In place of the phenolic resin (resols) employed in Examples G-1 through G-9 of Table VI heretofore one may employ in about the same quantities as set forth in the examples a halogenated aminoplast, as for example, the condensation product of one mole of urea with two moles of formaldehyde modified by introduction of a suitable haloaliphatic alcohol into the urea-formaldehyde product and the halo-alcohols which suitable for this purpose include 1-chloropentanol-5, 1-bromopentanol-5, 1-chlorooctanol-8, 1-bromooctanol-8, 1-chlorononylol-9, 1-bromononylol-9, 1-chlorodecylol-10, 1-bromodecylol-10, other halogenated isomers of these $C_8$ to $C_{22}$ alcohols and including dichlorostearyl alcohol, dibromo-stearyl alcohol, dichloro capryl alcohol, chloro-bromo capryl alcohol, dibromocapryl alcohol, dichloro-caprylyl alcohol, chloro-bromo-caprylyl alcohol, dibromo-caprylyl alcohol, dichloro-caproyl alcohol, chloro-bromo caproyl alcohol, dibromocaproyl alcohol and like halogenated alcohols.

It is of course understood that the compounding techniques employed herein especially employing halogenated and non-halogenated aminoplasts and phenoplasts can be employed with the new solid polymer modified, partially halogenated isoolefin multiolefin interpolymers of this invention as well as the aqueous dispersions thereof.

In Table VI, Examples G–1 to G–9, in place of the phenolic resins employed one may employ a halogenated or partially halogenated (especially a chlorinated and/or brominated with or without other halogen groups including fluoro and chloro groups) unsaturated polymer, especially a homo or multipolymer derived at least in part from a conjugated diene such as butadiene, isoprene, dimethyl butadiene, piperylene or other $C_4$ to $C_8$ conjugated diene. Thus the partially or completely chlorinated, brominated, chloro brominated with or without other halogen groups. Unsaturated polymers including halogenated natural rubber, polybutadiene butadiene-vinyl copolymers, especially the butadiene-styrene, the butadiene-vinyl toluene, the butadiene-acrylonitrile, butadiene-acrylate monomer copolymers similar polymers in which all or part of the butadiene is substituted by isoprene, piperylene and the like, including the chlorobutadiene polymers. When halogenating these unsaturated polymer latices, especially natural rubber latex it may be necessary to add an emulsifier or additional emulsifier and the non-ionic emulsifiers suitable for stabilizing polymer emulsions are particularly useful. Thus in place of the 8 grams of phenolic resin in Example G–1, Table VI, one may employ 8 grams (dry polymer solids basis) of a brominated natural rubber latex in which about one-half of the double bonds are brominated. In place of the 10 grams of phenolic resin in Example G–2 one may employ 10 grams (dry polymer solids basis) of a brominated chloroprene latex in which about one-half of the double bonds are brominated. In place of the 6 grams of phenolic resin in Example G–3 one may employ 6 grams (dry polymer solids basis) of a halo-brominated butadiene-styrene copolymer latex (GR-S 1500) in which about two-thirds of the double bonds are chloro-brominated. In place of the 12 grams of phenolic resin in Example G–4 one may employ 12 grams (dry polymer solids basis) of a chlorinated polybutadiene latex of which at least one-half of the double bonds have been chlorinated. When employing these halogenated unsaturated polymer latices including chloroprene and bromoprene latex per se it is preferable to employ a metal oxide e.g. zinc oxide and/or magnesium oxide in amounts from 5 to 10 parts per 100 parts of interpolymer material and/or one may employ an amine e.g. diethylene triamine or triethylene pentamine, mono-ethanolamine, diethanolamine, triethanolamine and the like. These halogenated unsaturated polymers may also be employed in combination with the phenolic resins and/or the halogenated phenolic resins, the aminoplasts and/or the halogenated aminoplasts. While the use of halogenated latices with latices of the isoolefin-multiolefin interpolymer have been exemplified, it is understood that the new solid polymer modified partially halogenated isoolefin-multiolefin interpolymers may be compounded with solid halogenated or partially halogenated unsaturated polymers provided such combinations are compatible in the solid phase which is not essential when preparing latex compounds of halogenated polymers with the interpolymers of this invention.

Thus the polymer modified partially halogenated polymer and aqueous dispersions thereof of this invention with or without other vulcanizable latices may be latex compounded, as set forth herein, and vulcanized to produce vulcanizates including vulcanized films, foam sponges and the like.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive to the invention, the scope of which is defined in the appended claim, and that all modifications that come within the meaning and range of equivalents of the claim are intended to be included therein.

We claim:

A process for the preparation of an aqueous polymer dispersion which consists in dissolving in a solvent a partially halogenated interpolymer composition, said polymer composition comprising polymerized $C_4$ to $C_8$ isoolefin in major proportion and polymerized $C_4$ to $C_{18}$ multiolefin in minor proportion, adding water to the resulting interpolymer solution and emulsifying the same with the aid of an emulsifying agent, removing the solvent from the resulting emulsion, then adding thereto polymerizable monomer material selected from the class consisting of the monomers containing and polymerizable through, at least one ethylenically unsaturated group and combination thereof, and polymerizing at least a part of said monomer material with the aid of a free-radical generating catalyst.

References Cited in the file of this patent

UNITED STATES PATENTS

| | | |
|---|---|---|
| 2,595,797 | Leyonmark et al. | May 6, 1952 |
| 2,824,055 | Lampe et al. | Feb. 18, 1958 |
| 2,943,664 | Baldwin et al. | July 5, 1960 |
| 2,947,715 | Charlet et al. | Aug. 2, 1960 |